UNITED STATES PATENT OFFICE.

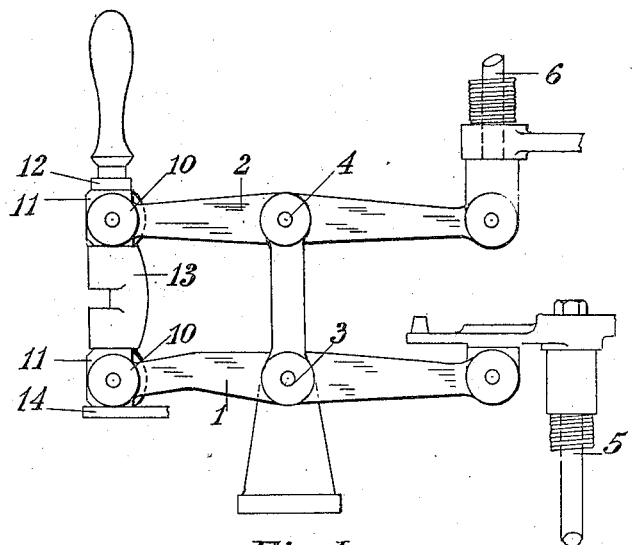
Fig. I
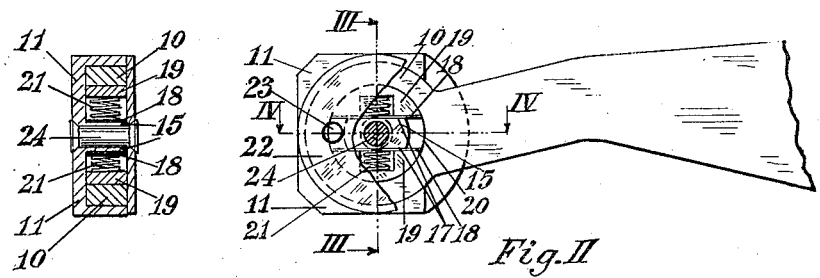
Fig. III  Fig. II
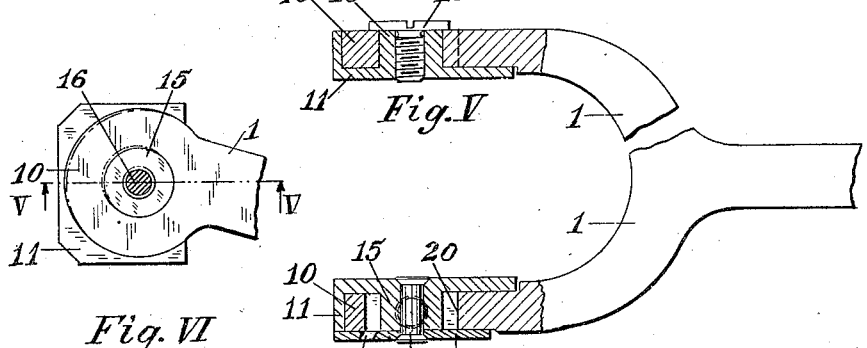
Fig. VI  Fig. IV
Harry Glass
Inventor
By his Attorney

HARRY GLASS, OF JAMAICA, NEW YORK.

SELF-ADJUSTING BEARING.

1,422,961.   Specification of Letters Patent.   Patented July 18, 1922.

Application filed July 25, 1921. Serial No. 487,293.

*To all whom it may concern:*

Be it known that I, HARRY GLASS, a citizen of the United States, and residing at No. 5 Hackett Place, Jamaica, Long Island, in the county of Queens and the State of New York, have invented certain new and useful Improvements in Self-Adjusting Bearings, of which the following is a specification.

This invention relates to improvements in self adjusting bearings and particularly to bearings in the smaller parts of machinery, as levers and brackets which operate under a heavy pressure and perform a reciprocating rotary movement. Such bearings occur frequently in the mechanism of various machines. The application of the invention is illustrated herein particularly in its adaption to the bearings of the pump and piston levers of type casting machines, which are commercially known as "monotype" machines.

It is the particular object of the present invention to avoid the renewal of these levers, which at present becomes necessary in a relatively short time, through the wearing out of the lever bearings. This is accomplished by providing a novel, self adjusting bearing for these levers. This novel bearing is capable to sustain the heavy duty without appreciable wear and its parts may be renewed, if such should ever become necessary, without the replacement of a complete lever.

With these and other objects in view the invention consists in certain novel combinations and arrangements of parts hereinafter fully described and illustrated in the accompanying drawings, which form a part of these specifications and as finally pointed out in the claims.

In the drawings—

Fig. I shows an elevation of a pair of levers provided with my self adjusting bearing assembled in a type casting machine.

Fig. II shows an elevation of a lever provided with the invention, a part of the protecting plate being broken out to show the interior.

Fig. III is a sectional elevation on the line III—III of Fig. II.

Fig. IV is a sectional plan on the line IV—IV of Fig. II.

Fig. V is a sectional plan on the line V—V of Fig. VI.

Fig. VI is an elevation of a lever-bearing of the old style not equipped with the improvement.

Similar characters of reference indicate corresponding parts throughout the various views.

Referring to Fig. I, lever 1 represents the pump body lever, and lever 2 the piston lever of a type casting machine. Both levers perform an oscillating motion about their fulcrums 3 and 4 when actuated by their respective spring rods 5 and 6. The front end of either one of the levers 1 and 2 is provided with a cylindrical lug 10 on which an outside bearing shoe 11 is rotatably mounted. The outside faces of these shoes form a rectangular box, the upper and lower horizontal faces of which are guided between corresponding faces of the parts 12—13—14, which are to be raised or lowered by the levers 1 and 2. In the common design of these bearings shown in Figs. V and VI, the box 11 is provided with a cylindrical pivot 15 integral with the box, which rotates in an axial aperture of the lug 10 and is held in place therein by means of the screw 16.

In my improved construction illustrated by Figs. II—III—IV the pivot 15 is provided with two parallel faces 17 against which the flat spring plates 18 lean; these springs hold two segmental bearing blocks 19 within a central aperture 20 of lug 10, each of these inner bearings holds, by means of a recess cut therein, a small helical spring 21 which presses against plate 18, and holds the segment in contact with the inner surface 20. A washer 22, provided with oil hole 23 closes the open side of box 11 and guides the box on the flat side of lug 10. The washer 22 and box 11 are held together by the central rivet 24.

To illustrate the advantages gained by the present invention it must be stated, that levers provided with the old style bearings illustrated in Figs. V and VI wear out in a very short time to the forms indicated by dash and dot lines in Fig. VI. Both curved faces of lug 10 wear to an oval shape with a consequent lost motion or back lash, which causes the type cast by the machine to be hollow. The only remedy in this case is a complete replacement of the lever and outer bearing so worn by a new set. By the present invention a worn lever and outer bearing may be restored to proper working conditions and will remain so, without appreciable wear for a very long time. The improvement is applied in the following manner: The worn outer surface of lug 10 is built up to cylindrical shape by adding metal by brazing or welding and the worn out central aperture of the lug is bored out large enough, to receive the segmental bearing blocks 19. The worn stud 15 is provided with the flat faces 17 by milling or in other suitable manner, and the parts 18, 21 and 22 are assembled as shown and held together by rivet 24 which occupies the place of screw 16 of the old construction.

In the old construction shown in Figs. V and VI wear always occurs first on the cylindrical surface bearing against stud 15, as indicated by dash and dot lines of Fig. VI. The total pressure on box 11 is divided in inverse ratio of the radii of cylinders 15 and 10 and therefore the unit bearing pressure on the smaller inner surface is greater than that on the outer one. Besides this the wear is enhanced by the alternating pressure from two opposite sides.

In the improved construction the pressure transmitted by 15 is distributed over a larger area by blocks 19 reducing the unit bearing pressure. The springs 21 do not permit any lost motion under the alternate pressure on either side of box 11.

Even a clearance between the outer face of 10 and 11 would not be harmful, as no lost motion can occur on the alternating stroke. It is also of considerable advantage that the hollow space between 15 and 20 will hold a quantity of lubricant which is injected through 23 and retained by washer 22 which provides a large guiding surface and permanent connection of all parts of the improved bearing.

Having thus described my invention what I claim as new and desire to secure by Letters Patent is:

1. In a device of the kind described the combination with two bearing surfaces formed by the inner and outer faces of a hollow cylinder, of a bearing block providing a rigid surface contacting on said outer face and a plurality of bearing shoes resiliently held in said block in contact with said inner face.

2. In a device of the kind described, a hollow cylinder having journal surfaces on its inner and outer curved sides, a rigid block in sliding contact with the outer side of said cylinder, a central stud on said block held within the hollow part of said cylinder and expansible means between said stud and the inner side of said cylinder.

3. In a device of the kind described a hollow cylinder forming bearing surfaces on its outer and inner curved sides, a rigid block rotatably held against the outer side of said cylinder adapted to transmit pressure thereto alternately in opposite direction, and expansible bearing shoes within the hollow parts of said cylinder engaged by said block to transmit pressure therefrom alternately in opposite direction to said inner side.

4. In a device of the kind described, a hollow cylinder adapted to transmit bearing pressure on its outer and inner curved surfaces, a bearing block rotatably mounted on said outer surface, a stud on said block held in axial alinement with said cylinder, bearing shoes in contact with said inner surface and resilient means between said stud and said shoes to press the latter radially in outward direction.

5. In a device of the kind described a hollow cylinder forming bearing surfaces on its inner and outer curved sides, a bearing block surrounding said cylinder on its outer side and adapted to receive pressure alternately in opposite direction, and resilient means in the hollow part of said cylinder to transmit pressure from said block in alternate direction to the inner surface of said cylinder.

HARRY GLASS.